United States Patent
Ho et al.

(10) Patent No.: US 7,581,645 B2
(45) Date of Patent: Sep. 1, 2009

(54) METHOD FOR MANUFACTURING CARBON NANOTUBES WITH DESIRED LENGTH

(75) Inventors: Chi-Chuang Ho, Tu-Cheng (TW); Bor-Yuan Hsiao, Tu-Cheng (TW); Ching-Chou Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 279 days.

(21) Appl. No.: 11/309,366

(22) Filed: Aug. 1, 2006

(65) Prior Publication Data

US 2007/0259115 A1    Nov. 8, 2007

(30) Foreign Application Priority Data

Sep. 9, 2005    (CN) .................. 2005 1 0037242

(51) Int. Cl.
*D01F 9/12* (2006.01)
*B82B 3/00* (2006.01)

(52) U.S. Cl. .................. 209/3.1; 423/460; 423/461; 423/447.1; 977/847; 977/845; 977/742; 977/745; 427/249.16; 427/272; 427/307; 427/309; 427/443.2; 209/1; 209/3; 210/749; 210/758; 210/760; 216/2; 216/41; 216/96; 216/58; 216/81; 216/83; 216/99

(58) Field of Classification Search .............. 423/447.1, 423/460, 461; 427/249.16, 272, 307, 309, 427/443.2; 977/847, 845, 742, 745; 209/3.1, 209/1, 3; 210/749, 758, 760; 216/2, 41, 216/96, 58, 81, 83, 99
See application file for complete search history.

(56) References Cited

U.S. PATENT DOCUMENTS

2002/0098135 A1    7/2002    Smalley et al.
2007/0231493 A1*   10/2007   Liu et al. .................. 427/355

\* cited by examiner

*Primary Examiner*—Stuart Hendrickson
*Assistant Examiner*—Michelle Hou
(74) *Attorney, Agent, or Firm*—Frank R. Niranjan

(57) ABSTRACT

A method for manufacturing carbon nanotubes with a desired length includes the steps of: providing an array of carbon nanotubes; placing a mask having at least an opening defined therein on the array of carbon nanotubes, with at least one portion of the array of carbon nanotubes being at least partially exposed through a corresponding opening of the mask; forming a protective film on at least one exposed portion of the array of carbon nanotubes; removing the mask from the array of the carbon nanotubes, with the carbon nanotubes being compartmentalized into at least a first portion covered by the protective film and at least one uncovered second portion; breaking/separating the first portion from the second portion of the array of the carbon nanotubes using a chemical method, thereby obtaining at least a carbon nanotube segment with a protective film covered thereon; and removing the protective film from the carbon nanotube segment.

8 Claims, 6 Drawing Sheets

METHOD FOR MANUFACTURING CARBON NANOTUBES WITH DESIRED LENGTH

FIELD OF THE INVENTION

The present invention generally relates to methods for manufacturing carbon nanotubes and, more particularly, to a method for manufacturing carbon nanotubes with a uniform length.

DESCRIPTION OF RELATED ART

Carbon nanotubes have interesting electrical, magnetic, nonlinear optical, thermal, and mechanical properties, and these unusual properties have led to diverse potential applications for carbon nanotubes in materials science and nanotechnology. For example, in an article entitled "Unusually High Thermal Conductivity of Carbon Nanotubes" (page 4613, Vol. 84, Physical Review Letters 2000), it is shown that a heat conduction coefficient of a carbon nanotube can be 6600 W/mK (watts/milliKelvin) at room temperature. One important application of carbon nanotubes is to form a thermal interface material by incorporating a number of carbon nanotubes in a matrix material. This application utilizes the excellent heat conduction coefficient of the carbon nanotubes.

Other applications may involve the use of freestanding carbon nanotubes, especially freestanding carbon nanotubes having a uniform length. Generally, chemical vapor deposition (CVD) method is a preferred method for manufacturing carbon nanotubes having a uniform length. The length of the carbon nanotubes manufactured by CVD method can be controlled to some extent by controlling the growth time. However, precise length of each carbon nanotubes is still difficult to control. Furthermore, once the carbon nanotubes have been grown, their length is fixed and they cannot be trimmed. If the length is not the desired length, a completely new batch of carbon nanotubes must be grown.

Therefore, a new method for manufacturing carbon nanotubes which overcomes the above-mentioned problems is desired.

SUMMARY OF THE INVENTION

A method for manufacturing carbon nanotubes with a desired length includes the steps of:

providing an array of carbon nanotubes;

placing a mask having at least an opening defined therein on the array of carbon nanotubes, with at least one portion of the array of carbon nanotubes partially exposed through a corresponding opening of the mask;

forming a protective film on at least one exposed portion of the array of carbon nanotubes;

removing the mask from the array of the carbon nanotubes, with the carbon nanotubes being compartmentalized into at least a first portion covered by the protective film and an uncovered second portion;

separating the first portion from the second portion of the array of the carbon nanotubes using a chemical method, thereby obtaining at least a carbon nanotube segment with the protective film thereon; and removing the protective film from the carbon nanotube segment.

Advantages and novel features will become more apparent from the following detailed description when taken in conjunction with the accompanying drawings.

BRIEF DESCRIPTION OF THE DRAWINGS

Many aspects of the present method can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE INVENTION

A method for manufacturing carbon nanotubes with a desired length is provided. The method includes the steps of:

(a) providing an array of carbon nanotubes;

(b) placing a mask on the array of the carbon nanotubes, with the array of the carbon nanotubes partially uncovered, at least a portion of the uncovered carbon nanotube sections having a desired length (advantageously all such uncovered sections having the desired length);

(c) forming a protective film on the uncovered carbon nanotubes;

(d) removing the mask from the array of the carbon nanotubes, with the carbon nanotubes being compartmentalized into at least a first portion covered by the protective film and an uncovered second portion;

(e) cutting a connection between the first portion and the second portion of the array of the carbon nanotubes using a chemical method; and (f) peeling off the protective film and modifying the first portion of the array of the carbon nanotubes to get the carbon nanotubes with the desired length.

Figure 1:
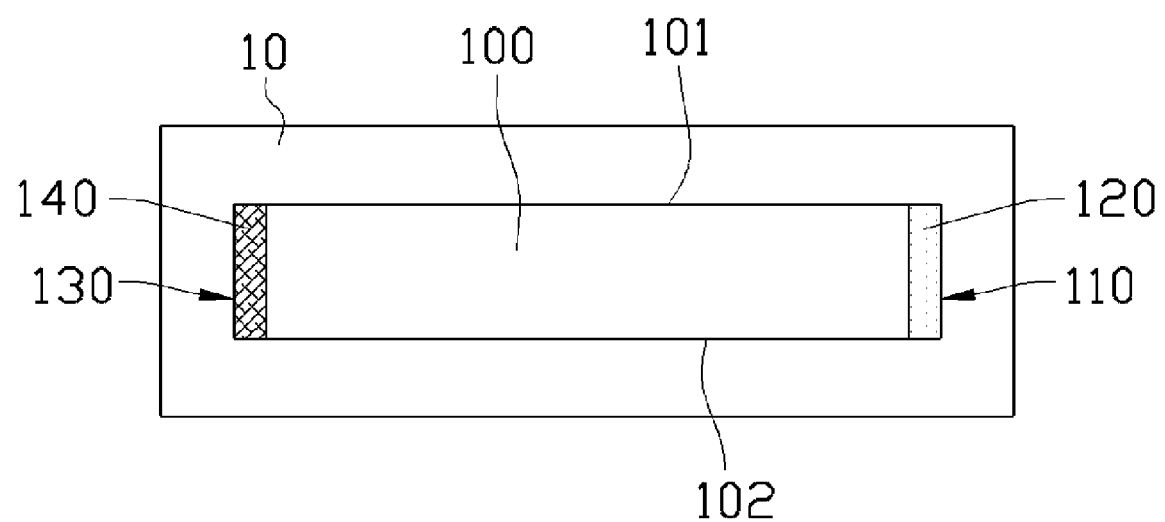
FIG. 1 is a schematic view of a substrate having a catalyst pattern and an electrode attached thereon according to a preferred embodiment.

In step (a), the array of carbon nanotubes can be manufactured by way of thermal chemical vapor deposition or plasma-enhanced chemical vapor deposition. Referring to FIG. 1, a substrate 10 having a groove 100 defined therein is provided. The groove 100 is advantageously rectangle-shaped and is defined by a first side surface 110, a second side surface 130 opposite to the first side surface 110, and two lateral side surfaces 101 and 102, each adjacent both of the first and second side surfaces 110 and 130. A catalyst film 120 is formed on the first side surface 110, and an electrode 140 is arranged on the second side surface 130.

Figure 2:
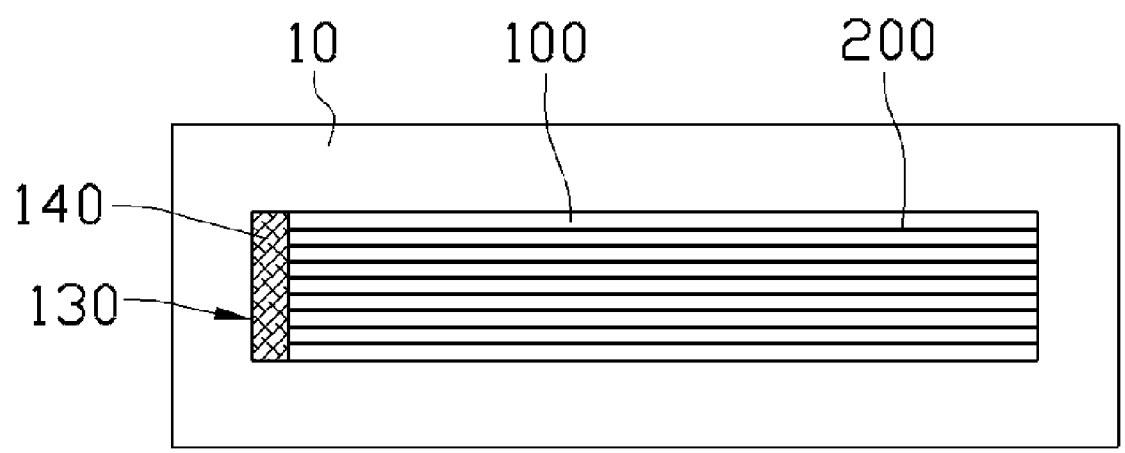
FIG. 2 is similar to FIG. 1, but showing an array of carbon nanotubes directionally formed on the substrate.

The substrate 10 can, beneficially, be made of glass, quartz, silicon or alumina. In the preferred embodiment, the substrate 10 is made of porous silicon. A surface of the porous silicon is constituted of a porous layer. Diameters of apertures in the porous layer are extremely small, generally about 3 nanometers. Referring to FIGS. 1~2, an array of carbon nanotubes 200 is manufactured as follows. Firstly, a catalyst film 120 is uniformly disposed on the substrate 10 by, e.g., chemical vapor deposition, thermal disposition, electron-beam disposition, and/or sputtering. The catalyst film 120 can, usefully, be made of iron (Fe), cobalt (Co), nickel (Ni), or an alloy thereof. In the preferred embodiment, the catalyst film 20 is made of iron.

Secondly, the catalyst film 20 is oxidized into catalyst oxide particles (not shown). Then, the substrate 10 with the catalyst oxide particles disposed thereon is placed in a reaction furnace (not shown), and a carbon source gas is introduced into the reaction furnace at a temperature of about 700° C. to 1000° C. to grow an array of carbon nanotubes 200. The carbon source gas can, for example, be acetylene or ethene. A length of the array of carbon nanotubes 200 can be roughly controlled, advantageously, by controlling a growth time, although other known growth factors (e.g., temperature, gas concentration, catalyst characteristics) may conjunctively or alternatively be regulated. For an excellent electrically conductive performance, a growth direction of the carbon nanotube array 200 can be guided by the electrode 140. As a result, the obtained carbon nanotube array 200 is approximately located inside the groove 100 and is perpendicular to the first and second side surfaces 110 and 130.

Figure 3:
FIG. 3 is similar to FIG. 2, but showing a mask placed on the substrate, with the array of the carbon nanotubes partially uncovered.

FIG. 3 shows a mask 300 defining a number of rectangular holes 310 therein. In step (b), the mask 300 is placed on the substrate 10. Thus, the array of the carbon nanotubes 200 is compartmentalized into a number of first portions 220 (referring to FIG. 4), which are masked by the mask 300, and a number of second portions 210, which are exposed from the holes 310. The second portions 210 of the array of carbon nanotubes 200 have a desired length. For example, in the present embodiment, the second portions 210 of the array of the carbon nanotubes 200 have a uniform length.

Figure 4:
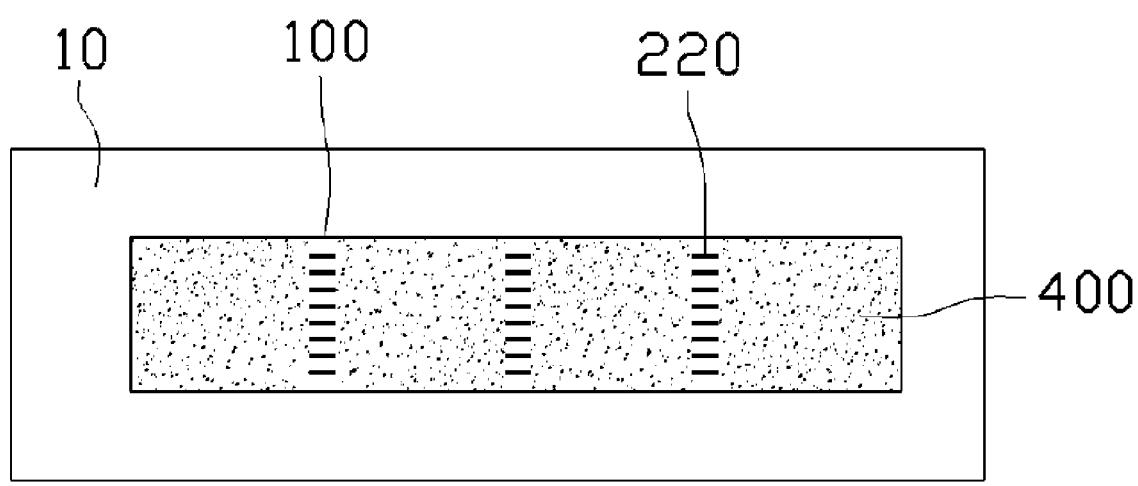
FIG. 4 is similar to FIG. 3, but showing a protective film formed on the uncovered carbon nanotubes.

Referring to FIG. 4, a protective film 400 is formed on the second portions 210 of the carbon nanotubes 200 by a spin-coating method or immersion plating method. The protective film 400 is composed of an anti-oxidizing material. Such a material may advantageously be chosen from the group including poly-silicon, silicon nitride, metal silicides, and the like. In a preferred embodiment, the protective film 400 is made of poly-silicon and is formed on the second portions 210 of the carbon nanotubes 200 by a spin-coating method. In step (c), in the spin-coating process, the substrate 10 is, first of all, put on a spin coater. Secondly, a poly-silicon solution is formed on the second portions 210 of the carbon nanotubes 200, exposed via the holes 310. Thirdly, fast spinning of the substrate 10 coagulates the poly-silicon solution. Finally, at an appropriate temperature, annealing the poly-silicon coagulation results in a number of poly-silicon film 400 segments.

Figure 5:
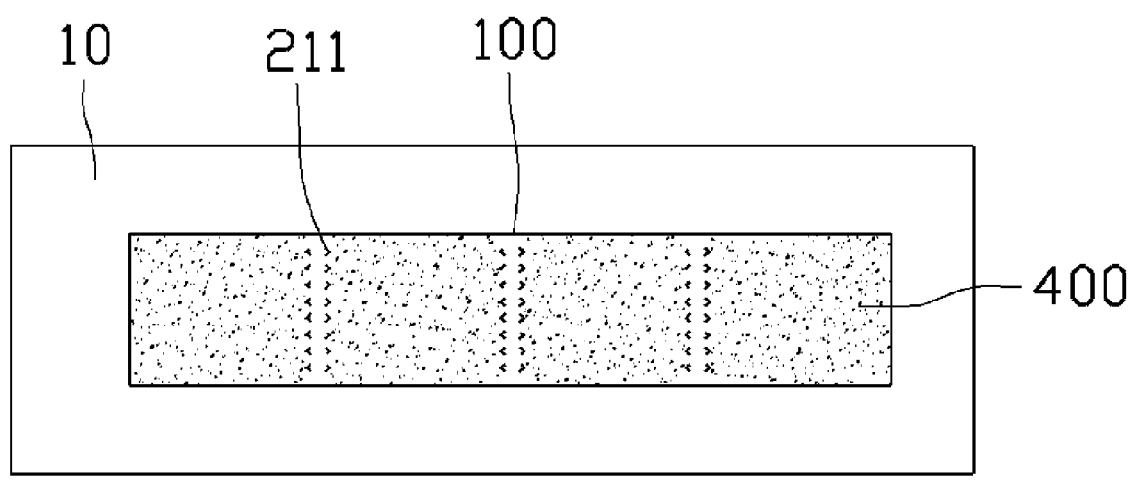
FIG. 5 is similar to FIG. 4, but showing that protective film on the carbon nanotubes has been cut.

FIG. 4 shows the array of the carbon nanotubes 20 with the mask 300 removed. In step (d), the mask 300 is removed from the array of the carbon nanotubes 200. The second portions 210 of the carbon nanotubes 200 are covered with the poly-silicon film 400 segments, while the first portions 220 are exposed. FIG. 5 shows the carbon nanotubes 200 broken/separated into a number of nanotube segments, i.e., the first portions 220 are broken/divided from the second portions 210 of the carbon nanotubes 200. In step (e), the carbon nanotubes 200 can be broken by way of oxidizing, etching, a double-bond-addition reaction, and/or a free-radical reaction. In a preferred embodiment, the carbon nanotubes 200 are oxidized to achieve separation. In this oxidizing process, the substrate 10 is arranged in a reactor filled with ozone gas. The first portions 220 of the carbon nanotubes 200 are exposed to the ozone gas and to thereby be oxidized by the ozone gas. The oxidization action causes a number of unsteady carbon rings, i.e., pentagon rings and heptagon rings of the first portions 220 to break, and the broken bonds form a number of side chains 211 connecting to the second portions 210. Each carbon nanotube 200 generally includes a significant number of pentagon rings, hexagon rings and heptagon rings. Attaching/forming a multitude of dangling bonds, the pentagon ring, and the heptagon rings are easily oxidized during an oxidizing condition.

In step (f), segments of the poly-silicon film 400 covered on the second portions 210 of the carbon nanotubes 200 are peeled off from the second portions 210. In a preferred embodiment, an appropriate solution, such as potassium hydroxide (KOH) or tetramethyl ammonium hydroxide ((CH3)4NOH), can be used to peel off the poly-silicon film 400. In the peeling process, the second portions 210 covered with the poly-silicon film 400 segments are mixed with a solution of KOH or (CH3)4NOH. In this manner, thus, the poly-silicon film 400 can be substantially dissolved by KOH or (CH3)4NOH. Preferably, the second portions 210 are further cleaned and dried.

Figure 6:
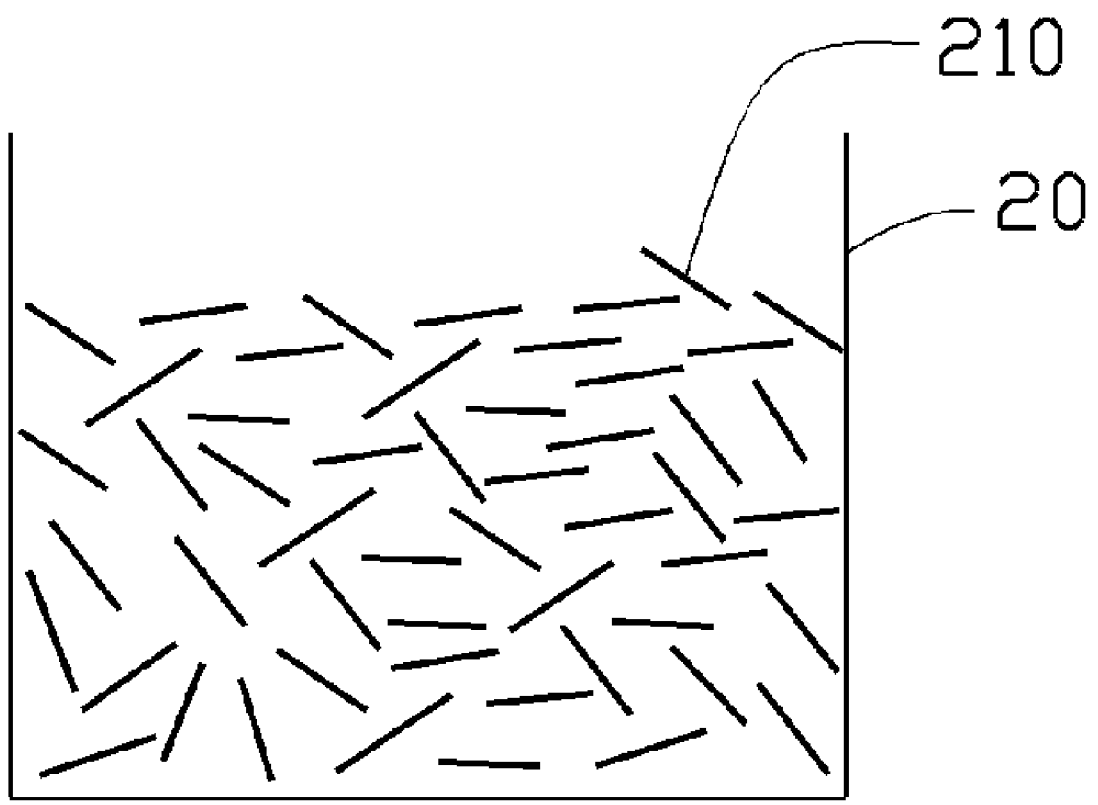
FIG. 6 is schematic view of a plurality of carbon nanotubes with a uniform length.

In addition, as the obtained carbon nanotube segments 210 (that is the second portions 210) tend to have multiple side chains 211 connected thereto, an additional step is preferred to remove those side chains 211. The side chains 211 can be removed by a ball-milling technique, including wet milling and/or dry milling. Generally, a ball-milling machine includes a container with a diffusing agent and balls contained therein. When performing the ball-milling process, the carbon nanotube segments 210 are positioned in the container and are mixed with the diffusing agent and the balls. Compared with a bond enthalpy of a carbon-carbon single bond in the hexagon rings, the bond enthalpy of the carbon-carbon single bond between the side chain 211 and the hexagon ring of the carbon nanotube segments 210 is relative small. During the milling process, two ends of the carbon nanotube segments 210 are continuously milled by the balls, and the side chains 211 are broken from the carbon nanotube segments 210. Thus, the carbon nanotube segments 210 with a uniform length are obtained. FIG. 6 shows the obtained carbon nanotube segments 210, each with a uniform length, held a container 20.

In the present embodiment, the length of the carbon nanotube segments 210 are determined by the dimensions of the holes 310. Compared with the conventional method, the carbon nanotubes manufactured by the present method have a desired length by predetermining the size of holes 310 of the mask 300. The length of the carbon nanotubes can, accordingly, be precisely controlled.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for manufacturing carbon nanotubes with a desired length, the method comprising the steps of:

providing an array of carbon nanotubes;

placing a mask, having at least an opening defined therein, on the array of carbon nanotubes, with at least one portion of the array of carbon nanotubes being at least partially exposed through a corresponding opening of the mask;

forming a protective film on at least one exposed portion of the array of carbon nanotubes;

removing the mask from the array of the carbon nanotubes, with the carbon nanotubes being compartmentalized into at least a first portion covered by the protective film and at least an uncovered second portion;

separating the first portion from the second portion of the array of the carbon nanotubes using a chemical method, thereby obtaining at least a carbon nanotube segment with the protective film thereon; and removing the protective film from the carbon nanotube segment.

2. The method as claimed in claim 1, wherein the protective film is comprised of at least one of poly-silicon, silicon nitride, and a metal silicide.

3. The method as claimed in claim 1, wherein the protective film is formed on the array of the carbon nanotubes by a spin-coating method or an immersion plating method.

4. The method as claimed in claim 1, wherein the chemical method for separating is an oxidizing method performed with an oxidation agent comprising ozone.

5. The method as claimed in claim 1, wherein the chemical method for separating is at least one of an oxidizing method, an etching method, a double-bond-addition reaction, and a free-radical reaction.

6. The method as claimed in claim 1, wherein the step of removing the protective film is performed using a solution of at least one of KOH and $(CH_3)_4NOH$.

7. The method as claimed in claim 1, wherein the carbon nanotube segment is additionally modified by a ball-milling method after removing the protective film.

8. A method for manufacturing carbon nanotubes with a desired length, the method comprising:

providing an array of carbon nanotubes;

placing a mask, having a plurality of openings defined therein, on the array of carbon nanotubes, each of carbon nanotubes having a plurality of spaced longitudinal segmental portions exposed through the respective openings of the mask;

forming a protective film on the exposed portions of the carbon nanotubes;

removing the mask from the array of the carbon nanotubes, with the carbon nanotubes being compartmentalized into a plurality of first portions covered by the protective film and at least an uncovered second portion;

separating the first portion from the second portion of the array of the carbon nanotubes using a chemical method, thereby obtaining a plurality of carbon nanotube segments with the protective film thereon; and removing the protective film from the carbon nanotube segments.

* * * * *